Patented Jan. 10, 1939

2,143,022

UNITED STATES PATENT OFFICE 2,143,022

FIBERIZED MINERAL FELT

Benjamin C. McClure, Chicago, Ill.

No Drawing. Application May 22, 1933,
Serial No. 672,235

4 Claims. (Cl. 106—36.3)

This invention relates to an article of manufacture consisting of a felted body or blanket of fiberized mineral compound, and particularly mineral compound which, when subjected to the process of fiberization, will possess such physical properties that when driven against a collecting wall they will felt themselves into a body having such integrity of mass structure as will enable the body to retain its shape during manipulation and while in position of use.

In my Patent No. 1,913,242, in which I have claimed a felted mass of the kind described, the essential ingredients selected for illustration, besides silica, for instance, silicon dioxide, are base materials, such as alkali metal serving as a flux and alkali earth serving mainly as a stabilizing ingredient but having also some fluxing effect. But I have established by experience that the fiberizing qualities of the mineral are improved in particulars which are reflected in desirable qualities of the finished felted product, if in addition to basic materials one or more amphoteric materials are introduced, especially if the stabilizing base material be not too great in quantity; the improvement vested thereby in the mineral product being along the lines of improved viscosity which is reflected directly in the length and quality of the fibers and increase of fluxing capacity. For instance, if a formula identified (in terms of finished product analysis) as mainly silicon dioxide ($SiO_2$), say, 70 parts, a stabilizing basic material, say calcium oxide (CaO) reduced to 5 parts, and a fluxing basic material, say, sodium oxide ($Na_2O$) 17 parts, is made to contain, also, an amphoteric ingredient or ingredients aggregating about 8 parts, for instance, an amphoteric lending viscosity, say, aluminum trioxide ($Al_2O_3$) 4 parts and an amphoteric having a fluxing value, say, boron trioxide ($B_2O_3$) 4 parts, or some modification of these proportions, the resultant mass, when subjected to a fiberizing influence, such for instance as blasting a small stream of it with a steam or other gaseous jet, will result in a fiber of peculiarly desirable qualities as to length, fineness and resiliency, all of which lend better qualities to the felted body or blanket formed.

I have further discovered that the aforesaid conditions may be realized if basic materials are used other than those enumerated, for instance, magnesium oxide, potassium oxide and lead oxide. One or more of these additional basic ingredients may be used in addition to the calcium oxide, or in substitution thereof, and they will naturally vary in the proportions in which they are used according to the number of them employed and whether or not they are in substitution of or supplemental to the calcium oxide.

It is not necessary that the silica source (silicon dioxide) be combined with both an amphoteric and a base. Good fiberizing qualities may be realized by having it combined with one or more amphoterics, for instance, aluminum trioxide and boron trioxide; and also by having it combined with one or more bases other than those enumerated in my aforesaid application, for instance, magnesium oxide, potassium oxide and lead oxide. Moreover, good results may also be obtained by combining the silica source with one or more materials from each of said groups.

Where silicon dioxide is used in a proportion between 40 and 80% of the whole, an amphoteric material capable of combining therewith to make a satisfactory fiberizing mass may be used in a proportion between 20 and 60% of the whole; a good specific formula being silicon dioxide 70% and boron trioxide 30%. If it is desired to use a basic material in addition to the amphoteric, the proportions may be, silicon dioxide from 39 to 80 parts, base material from 1 to 60 parts, and an amphoteric material from 1 to 60 parts. For instance, with boron trioxide as the amphoteric and lead oxide as the base, formulas could be used with the silica and these two materials in the proportions of from 39 to 80 parts of the silica source, 1 to 60 parts of the boron trioxide, and 1 to 60 parts of the lead oxide. A desirable specific formula for these three materials would be silicon dioxide 70, boron trioxide 10, and lead oxide 20. If lead oxide is to be the base material, the proportions may be from 40 to 80 of silicon dioxide and 20 to 60 of the lead oxide.

Another analysis of a felted mass of fiberized mineral that would be commercially desirable because of its physical properties, would be silicon dioxide in a proportion of about 60%; trioxide of aluminum and trioxide of boron, either or both of them, in a proportion of about 8%, constituting the amphoteric material; sodium oxide or potassium oxide, either or both of them, aggregating about 17½% as fluxing bases; and one or more of the bases calcium oxide, magnesium oxide and lead oxide, aggregating about 14½%. Analysis of a modification of the last described material would be ingredients in about the following proportions: Silicon dioxide 60%; aluminum trioxide 4%; calcium oxide 4%, magnesium oxide 2%; sodium oxide 16%; boron trioxide 4%, potassium oxide 1.5%; and lead oxide 8.5%.

The present invention lends itself advantageously to the incorporation of materials having the capacity of lending desired colors to the finished product or changing it from translucency or transparency to opacity, both of which phenomena are to be understood under the term "color" in the present case; and materials for this latter purpose could be selected which would function in the batch or constituency of the finished product in the same manner as certain of the ingredients herein proposed to be used. For instance, in the analysis last stated, one or more equivalents of lead oxide could be omitted and replaced by cobalt oxide, with the effect of lending a distinctive color to the resultant product and at the same time maintaining a balance in the resultant product. Similarly, a proportion of manganese oxide could be used. In the same way, iron oxide could be used to lend a green color and still maintain the balance of the finished product. Copper oxide would lend its characteristic color. The oxides of antimony, tin, titanium, zirconium, and some others could be used for lending color and, like the presence of fluorine in the finished product, would lend opacity or whiteness to the finished product. Some of these, however, may have acid reaction rather than basic, and some would even be amphoteric in their relation to the formula, and would be used as substitutes in their respective classes of materials in the formulas herein given. In this way, colors may be bestowed upon products embodying the subject-matter of the present invention, for instance, insulation, which are advantageous in the product for their effect upon the transmission of heat waves.

I claim:

1. As a new article of manufacture, a felted body of fiberized mineral, said body having the inherent structural qualities of high resiliency and mass integrity under manipulation, and containing as ingredients of its constituent fibers the following materials in approximately the proportions given; silicon dioxide ($SiO_2$) 60%; aluminum trioxide ($Al_2O_3$) 4%; calcium oxide (CaO) 4%; magnesium oxide (MgO) 2%; sodium oxide ($Na_2O$) 16%; boron trioxide ($B_2O_3$) 4%; potassium oxide ($K_2O$) 1.5%; and lead oxide (PbO) 8.5%.

2. As a new article of manufacture, a felted body of fiberized mineral compound containing silicon dioxide in a proportion of about 70% of the whole, a stabilizing base material consisting of about 5% of calcium oxide, a fluxing amphoteric material consisting of about 17% of sodium oxide; and an amphoteric material lending viscosity consisting of about 4% boron trioxide.

3. A felted body of fiberized mineral, the fibers of which contain about 70% of silicon dioxide, 20% of lead oxide, and 10% of boron trioxide.

4. A felted body of fiberized mineral, the fibers of which contain about 70% of silicon dioxide, 5% calcium oxide, 17% of sodium oxide, 4% of boron trioxide, and 4% of aluminum trioxide.

BENJAMIN C. McCLURE.